United States Patent
Stober et al.

(10) Patent No.: US 11,085,785 B2
(45) Date of Patent: Aug. 10, 2021

(54) NAVIGATION BOARD

(71) Applicant: INTERNATIONAL BUSINESS MACHINES CORPORATION, Armonk, NY (US)

(72) Inventors: Thomas Stober, Herrenberg (DE); Uwe K. Hansmann, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 16/359,356

(22) Filed: Mar. 20, 2019

(65) Prior Publication Data

US 2020/0300651 A1    Sep. 24, 2020

(51) Int. Cl.
   *G01C 21/36*   (2006.01)
   *G06K 19/07*   (2006.01)
   *G06K 7/10*   (2006.01)
   *G01S 19/13*   (2010.01)

(52) U.S. Cl.
   CPC ....... *G01C 21/362* (2013.01); *G06K 7/10366* (2013.01); *G06K 19/0723* (2013.01); *G01S 19/13* (2013.01)

(58) Field of Classification Search
   CPC ... G01C 21/00; G01C 21/362; G06K 19/0723
   See application file for complete search history.

(56) References Cited

U.S. PATENT DOCUMENTS

| 9,360,337 | B2 | 6/2016 | Moshfeghi |
| 2003/0080901 | A1* | 5/2003 | Piotrowski ............ G01S 13/751 342/386 |
| 2007/0176780 | A1 | 8/2007 | Hart |
| 2013/0181814 | A1 | 7/2013 | Smith |

FOREIGN PATENT DOCUMENTS

| KR | 20070108614 A | * | 11/2007 | |
| WO | WO-2006059818 A1 | * | 6/2006 | ....... G08G 1/096894 |

OTHER PUBLICATIONS

Agarwal, "How to Create your own google Maps", [online], Digital Inspiration, Jul. 19, 2012, [retrieved on Aug. 31, 2018], 5 pages, Retrieved from the Internet: <URL: https://www.labnol.org/internet/create-google-maps/20231/.

Mell et al., "The NIST Definition of Cloud Computing", National Institute of Standards and Technology, Special Publication 800-145, Sep. 2011, pp. 1-7.

* cited by examiner

*Primary Examiner* — Thomas G Black
*Assistant Examiner* — Tarek Elarabi
(74) *Attorney, Agent, or Firm* — L. Jeffrey Kelly (57) ABSTRACT

A system for programming an intended geographical destination into a global positioning system enabled vehicle navigation system is provided. The system includes a navigation board with a surface comprising a symbol at a position of an RFID tag representing a geographical destination. The system includes a vehicle key comprising an RFID tag reader adapted for a wireless reading of an identifier value of the RFID tag if the vehicle key is in proximity of the RFID tag. The vehicle key can store and memorize the RFID tag identifier value. The system includes a vehicle navigation system including a receiver for receiving the identifier value stored in the vehicle key if the vehicle key is in an activation mode for the vehicle such that the vehicle navigation system is programmed with the geographical destination represented by the at least one RFID tag of the navigation board.

17 Claims, 6 Drawing Sheets

NAVIGATION BOARD

BACKGROUND

The invention relates generally to a system for programming an intended geographical destination into a global positioning system enabled vehicle navigation system. The invention relates further to a computer-implemented method for programming an intended geographical destination into a global positioning system enabled vehicle navigation system, and a computer program product.

Driving with a navigation system is a way of obtaining directions towards an intended destination, and to obtain live traffic information including available detours to avoid heavy traffic.

Navigation systems may be connected to a cloud infrastructure. A driver's electronic devices, including their car and their smart phone may be inter connected and exchange information, such as favorite locations at a destination or another travel location. A driver can choose their next destination by selecting from a list of favorites on their smartphone or their car navigation system. The user interface can provide a seamless experience. However, the user interface may experience difficulty, for example with an older car with an aging navigation system.

A disadvantage of known solutions for programming an intended geographical destination into a global positioning system enabled vehicle navigation system may be limited ability to provide an obstacle-free information flow from the off-line world of a text written to a surface to a car navigation system.

Thus, there may be a need to overcome the mentioned limitations, i.e., to provide programming capabilities for a vehicle navigation system that links or connects to off-line information.

SUMMARY

According to an embodiment of the present invention, a system for programming an intended geographical destination into a global positioning system enabled vehicle navigation system is provided. The system may include a navigation board comprising at least one radio frequency identifier, (hereinafter "RFID"), tag underneath its surface. The surface may include a symbol at a position of the RFID tag, wherein the RFID tag may represent a geographical destination.

The system may include an RFID-enabled vehicle key including an RFID tag reader adapted for a wireless reading of an identifier value of the at least one RFID tag of the navigation board if the vehicle key is in proximity of the at least one RFID tag of the navigation board and, may also include a vehicle key also comprising a memory for storing the identifier value of the at least one RFID tag.

Additionally, the system may include a vehicle navigation system, a receiver for receiving the identifier value stored in the vehicle key if the vehicle key is in an activation mode for the vehicle such that the vehicle navigation system is programmed with the geographical destination represented by the at least one RFID tag of the navigation board.

According to another embodiment of the present invention, a computer-implemented method for programming an intended geographical destination into a global positioning system enabled vehicle navigation system is provided. The method may include reading an identifier value of an RFID tag by a reader of an RFID-enabled vehicle key if the vehicle key is in proximity of the RFID tag of a navigation board. Thereby, the navigation board may include at least one RFID tag underneath its surface and, the surface may include a symbol—e.g., handwriting—at a position of the at least one RFID tag. The at least one RFID tag may represent a geographical destination.

Furthermore, the method may include storing the identifier value of an RFID tag in a memory of the vehicle key, receiving, by a receiver of a vehicle navigation system, the identifier value stored in the vehicle key if the vehicle key is in an activation mode for the vehicle, and programming the vehicle navigation system with the geographical destination represented by the at least one RFID tag of the navigation board as a next destination.

The proposed system, as well as the related method, for programming an intended geographical destination into a global positioning system enabled vehicle navigation system may offer multiple advantages and technical effects:

The combination of the navigation board together with the RFID enabled vehicle key and the vehicle navigation system may allow an elegant way to program the vehicle navigation system for a geographical location, i.e., a next destination. As an example, the navigation board may be located at a convenient place in an apartment or house, close to the place where car keys may typically be positioned if not used. The navigation board may have listed, e.g., handwritten notes on a whiteboard as a navigation board, typical locations or destinations of a user. The whiteboard may also show maps or other sketches related to a destination. The whiteboard may be a calendar for sales or service personnel showing for example, one or more destinations of a salesperson or technician on a specific day.

When the proposed system is set up, the vehicle navigation system may have stored value tuples relating identifier values of RFID tags and geographic locations. If a user travels from one location to another, e.g., travel from their home or office, they may position their vehicle key in proximity to a destination listed on the navigation board. The vehicle key and the RFID tag of the navigation board would exchange the identifier value of the RFID tag (i.e., the vehicle key may receive and store the identifier value), and if the vehicle key would be brought into the car to start the engine, a sender of the vehicle key would communicate the received identifier value of the RFID tag to the vehicle navigation system.

When the car navigation system has already associated a destination to the received RFID tag identifier value, the vehicle navigation system would direct the driver without any required interaction with the vehicle navigation system to the intended destination. This may represent a very convenient and intuitive way for the user to instruct the vehicle navigation system to show him the way to his intended destination.

The proposed concept may also easily be integrated into existing car key/vehicle systems because modern car keys are often equipped with RFID transceivers, a controller with computer capacities and storage. Such car keys are also often enabled to communicate with the car or vehicle electronic system. In many cases, it is no longer required to position the car key into a slot for starting the engine. The presence of the car key—which may also be used for a "keyless" opening of the doors—inside the vehicle enables a starting of the engine by pressing a button because the presence of the car key is detected by the vehicle electronic system.

In the following, additional embodiments of the inventive concept, applicable to the system as well as to the related method, will be described.

According to an embodiment, the system may include a mobile device, for example, a smartphone, with a respective application including an RFID tag reader enabled to wirelessly read the identifier value of the at least one RFID tag of the navigation board if the mobile device is in proximity of the at least one RFID tag of the navigation board.

In an embodiment, this enhanced solution may allow using the smart phone as a transmitting device of the identifier value of the navigation board to the vehicle navigation system, similar to the vehicle key.

Additionally, it may be possible to relate additional information to the received identifier value.

For that purpose and, according to another embodiment of the system, the mobile device may include an assignment unit adapted for assigning a geographical location, i.e., a destination—to the received identifier value of the RFID tag of the navigation board, to define a value tuple including the identifier value and the geographical location.

Furthermore, it may be possible that a smartphone, i.e., a mobile device, may be positioned to a plurality of RFID tags of the navigation board such that a plurality of tuples may be built in the smartphone including unique RFID tag identifier values and individually related geographical locations, i.e., different intended destinations. The prepared smartphone may now be taken to the vehicle for transferring the information of the tuple(s) to the vehicle navigation system.

According to a preferred embodiment of the system, the assignment unit may be adapted for accessing geographical location from an address storage which is accessible by the mobile device. Thereby, the address storage may be local in the mobile device or remote to the mobile device, i.e., implemented as a cloud computing solution. This way, it becomes possible, for set-up purposes, a user may relate received RFID tag identifier values to addresses of their electronic address book.

Furthermore, according to an additionally preferred embodiment of the system, the mobile device may also include a sending unit adapted for sending the value tuple including the RFID tag identifier value to the vehicle navigation system for storing the value tuple in a location memory of the vehicle navigation system. This may be an improvement to a user unfriendly situation where a user must type in an intended destination when a vehicle navigation system does not have information related to a given RFID tag identifier.

Using the techniques in this embodiment, the vehicle navigation system may be programmed with those tuples that have been set up in the mobile device with corresponding addresses. However, it may be noted that such a procedure may only be required once in order to set up the car navigation system. Instead of communicating the tuple from the smart device to the vehicle navigation system via a short-range communication channel (e.g., Bluetooth or via RFID frequencies), the communication may also happen via a mobile cell communication system, e.g., via a cloud computing environment of a service provider.

According to an advanced embodiment of the system, the identifier value of the RFID relates to a predefined geographical location according to a publicly available address book. This may be used for publicly available signposts with navigation boards, e.g., positioned in an entrance to a village. Points of interest of the village may be shown on a map which may be located on a navigation board or, the RFID tags may be integrated into the map.

The user may again position his vehicle key in a proximity to a point of interest on the map of the village, take his vehicle key back into his car and the vehicle navigation system will automatically guide him to the intended destination. This may require that the vehicle navigation system may be enabled to request coordinates of other destination relating to the RFID tag identifier value received via the vehicle keys from a public database of address book via a mobile communication channel, e.g., a mobile phone network.

Hence, and according to an optional embodiment of the system, the vehicle navigation system may be adapted to receive value tuples of identifier values and the related geographical locations from the publicly available address book. An update of such tuples may be made on a regular basis or only if it is detected by the vehicle navigation system that the car is reaching the city limits of a village. Additionally, a signpost navigation board may also be adapted to transmit its set of tuples to the vehicle navigation system directly and a mobile cell phone network may not be required. The transfer of the RFID tag identifier value of the intended destination via the vehicle key is a significant advantage in providing destination information.

According to an additionally preferred embodiment of the system, the navigation board may include a plurality of RFID tags underneath its surface representing a plurality of geographical destinations. Such a set up with a plurality of RFID tags may represent a typical implementation of the proposed concept. It may allow the user to select between different intended destinations. Some of the RFID tags may have symbols related to it, handwritten, by magnetic stickers, by adhesive stickers, etc.

Furthermore, an embodiment may take the form of a related computer program product, accessible from a computer-usable or computer-readable medium providing program code for use, by, or in connection, with a computer or any instruction execution system. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'geographical destination' may denote, e.g., an address of a person's home, a company, a point of interest, an office location, or, in general any other place or location that may be located using global positioning system coordinates. The geographical destination may be a location interpretable by a navigation system in form of an address (city, street, number) or in the form of GPS coordinates.

The term 'global positioning system', (hereinafter "GPS") may denote the satellite-based radio-navigation system. It is a global navigation satellite system that provides geolocation and time information to a GPS receiver anywhere on or near the Earth where there is an unobstructed line of sight to four or more GPS satellites.

The term 'vehicle navigation system' may denote a system enabled to receive GPS signals of a satellite-based radio-navigation system and display direction information on a screen. A user may interact with the vehicle navigation system in order to input an intended destination so that the vehicle navigation system may direct the user, or an autonomous vehicle, to the intended destination. Alternatively, the direction information may also be output as audio signals. It may also be noted that the term 'vehicle navigation system' may here be used as a term not only for car navigation systems but only for navigation systems for motorcycles, trucks, bikes, pedestrians/hikers, among others. Thus, in the context of this document a vehicle navigation system may not only be affixed to the dashboard of a car, but it may also denote an independent GPS receiver system that may be carried around. Alternatively, the vehicle navigation system may be integrated into any mobile device, e.g., a smartphone, a smartwatch and the like.

The term 'navigation board' may denote a board, for example, a map, which may be flat and may include relief-type surfaces to indicate landform configuration including buildings and other objects, or an otherwise structured surface, which is equipped with a radio frequency identifier, (hereinafter "RFID") tag at positions of special interest.

The RFID tags may be positioned in a regular grid behind or in the surface of the navigation board, or alternatively, the RFID tags may be positioned at special locations of the relief-type surface. A relief-type surface may be a model of a village, city or landscape showing different places of interest. At each of these places an RFID tag may be positioned.

In case the navigation board has a flat surface, it may be designed as a sort of whiteboard to make non-permanently notes with a marker on the surface, e.g., write names on it or make other sorts of notes. The RFID tag may also be affixed with magnetic stickers to the navigation board's surface. This way, different types of stickers may be used for different types of destinations.

The term 'RFID tag' may denote a small electronic circuits (tag) to send and receive electromagnetic fields to automatically identify tags attached to objects. The RFID tag may contain electronically-stored information, e.g., an identifier value. A passive RFID tag can collect energy from a nearby RFID reader's interrogating radio waves. An active RFID tag has a local power source (such as a battery) and may operate hundreds of meters from the RFID reader. Unlike a barcode, the tag does not need to be within the line of sight of the reader, so it may be embedded in the tracked object. RFID is one method for Automatic Identification and Data Capture (AIDC).

The term 'RFID-enabled vehicle key' may denote a key for a vehicle with the additional capability of reading information from an RFID tag. Additionally, the RFID-enabled vehicle key may also be equipped with a sender or transceiver in order to communicate with a vehicle navigation system. The RFID-enabled vehicle key may include an RFID tag reader readout for one or more of the identifier values of the navigation board.

The term 'activation mode' may denote the activity to set electric and electronic systems in a vehicle in a switched on status. A user may turn the activation mode on and the user may turn the activation mode off. For a car with a smart key, i.e., a key that does not need to be put into a slot to be turned around to start the vehicle engine, it may mean that the smart key only needs to be positioned into the inside of the car (not the trunk) in order to start the engine with a push of a button. However, without starting the engine, typically, the electronic systems of the vehicle have been activated already so that a communication from a sender of the RFID-enabled vehicle key to a vehicle navigation system may have been activated.

The term 'value tuple' or 'tuple' may denote a pair of information items including one value tuple, which includes (i) an identifier value of a specific RFID tag and (ii) a related address, or otherwise specified geographical location.

In the following, a detailed description of the figures will be given. All instructions in the figures are schematic. First, a block diagram of an embodiment of the inventive system for programming an intended geographical destination into a global positioning system enabled vehicle navigation system is given. Further embodiments, as well as embodiments of the computer-implemented method for programming an intended geographical destination into a global positioning system enabled vehicle navigation system, will be described.

Embodiments of the present invention relate to the field of computing, and more particularly to a system for programming an intended geographical destination into a global positioning system enabled vehicle navigation system. The following described exemplary embodiments provide a system, method, and program product to, among other things, program an intended geographical destination into a global positioning system enabled vehicle navigation system. Therefore, the present embodiment has the capacity to improve the technical field of global positioning system enabled vehicle navigation system by linking or connecting to off-line information by reading an identifier value of an RFID tag by a reader of an RFID-enabled vehicle key if the vehicle key is in proximity of the RFID tag of a navigation board.

Figure 1:
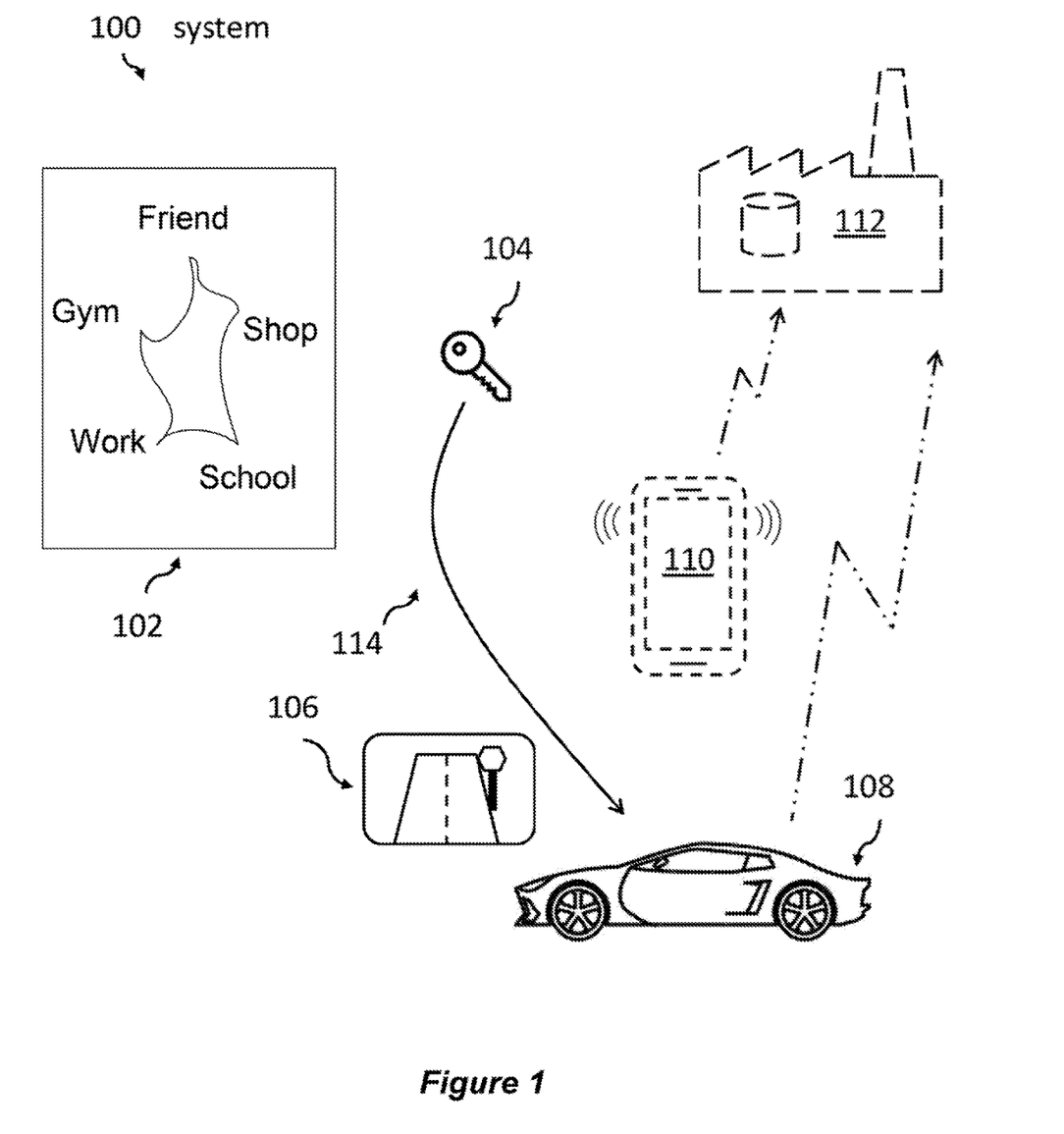
FIG. 1 shows a block diagram of an embodiment of an inventive system for programming an intended geographical destination into a global positioning system enabled vehicle navigation system, according to at least one embodiment.

FIG. 1 shows a block diagram of an embodiment of a system 100 for programming an intended geographical destination into a global positioning system enabled vehicle navigation system, according to an embodiment. The vehicle may be a bike, a motorcycle, a car, a truck, a boat, or another vehicle. The system includes a navigation board 102 including a first radio frequency identifier tag, hereinafter "first RFID tag" underneath, in, or behind a surface of the navigation board 102. The surface includes a symbol at a position of the first RFID tag. The first RFID tag represents a geographical destination. As an example, a destination may be "gym", "school", "shop", "friend", "work", among other destinations indicated on the navigation board 102. There may be more than one destination and corresponding RFID tag on the navigation board 102.

The system 100 may also include an RFID enabled vehicle key 104 (hereinafter "vehicle key 104"). The vehicle key 104 may include an RFID tag reader adapted for wireless reading of an identifier value of the first RFID tag of the navigation board 102 when the vehicle key 104 is brought in proximity of the first RFID tag of the navigation board 102. The vehicle key 104 may also have a memory, i.e., storing means, for storing the identifier value of the first RFID tag.

The system 100 may also include a vehicle navigation system 106, which may be part of a car 108, i.e., a car navigation system. However, the vehicle navigation system 106 may also be used for hiking, sailing, motor-biking, cycling, in trucks, and so on. Thus, the vehicle navigation system 106 may be a mobile GPS-based navigation system independent of a car 108.

The vehicle navigation system 106 may also include a receiver for receiving the identifier value stored in the vehicle key 104 if the vehicle key 104 is in an activation mode for the vehicle, e.g., if the car is started or intended to be started, such that the vehicle navigation system 106 is programmed with the geographical destination represented by the first RFID tag of the navigation board 102.

If there is no mapping available to the vehicle navigation system 106 between the first RFID tag identifier value and a geographical location (an intended destination), a user may type in an internet destination and/or geographical information relating to the received first RFID tag identifier value or may use the navigation system's internal address book. Once such a tuple has been defined, each subsequent time the vehicle navigation system 106 receives the first RFID tag identifier value, the vehicle navigation system 106 is automatically programmed to the geographical location relating to the first RFID tag identifier value.

Additional elements of the system 100 may include a smartphone 110 and a cloud computing center 112. The smartphone 110 may also be equipped with an RFID reader (not shown) which may be associated with an RFID tag of the navigation board 102. An application, which may be referred to as an app, of the smartphone 110 may enable the user to define a related geographical position for each RFID tag of the navigation board 102. This may be done using an internal address book of the smartphone 110 or an address book to which the smartphone 110 may have access from a cloud computing center 112, or the user may type in the intended address so to build tuples of RFID tag identifier values and geographical locations.

Additionally, the car navigation system 106 may be wirelessly connected (e.g., by cell phone system) to the same or another computing center 112 in order to receive address data, communicate with the smartphone 110 or for other purposes. Furthermore, the smartphone 110 may have an integrated a transceiver unit (not shown) to communicate with the vehicle navigation system 106 when the smartphone 110, is e.g., inside the car (e.g., Bluetooth, WiFi). Thus, the tuples built in the smartphone 110 may be communicated in block to the vehicle navigation system 106 in a single operation. After that, bringing the key 104 in a proximity of one of the RFID tags of the navigation board 102 before starting a trip and using the key 104 to activate the vehicle 108 by carrying the key 104 from the location of the navigation board 102 to the vehicle—indicated as arrow line 114—enables an automatic programming of the vehicle navigation system 106 with the geographical location/intended destination relating to the first RFID tag, and any other RFID tags on the navigation board 102. It may also be noted that the process as describes may also work with an RDIF enabled vehicle key 104 that is put into a slot and turned for starting an engine of the car 108.

Figure 2:
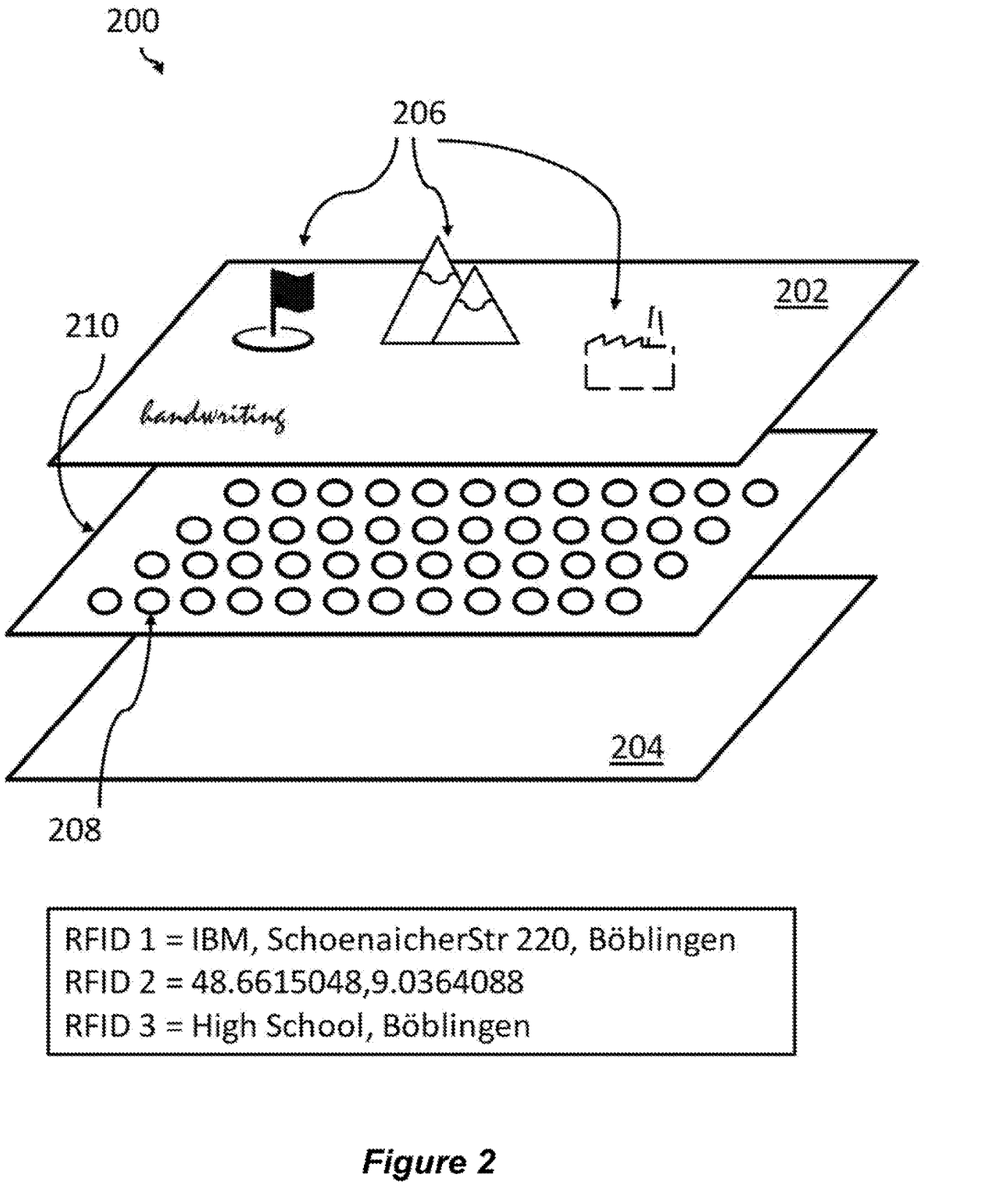
FIG. 2 shows a block diagram of an embodiment of a navigation board, according to at least one embodiment.

FIG. 2 shows a block diagram of an embodiment of a navigation board 200, according to an embodiment. The navigation board 200, similar to the navigation board 102, may include a rigid back or base 204, a surface 202 and a middle layer 210. The middle lay may include at least one or typically a plurality of RFID tags 208 below the surface 202. The one or more RFID tags 208 may each have a stored unique identifier value. Thus, an RFID tag reader, integrated into an RFID-enabled vehicle key, for example the vehicle key 104, can read the unique identifier value of a specific RFID tag of the one or more RFID tags 208 when brought into its proximity.

The surface 202 may be designed similar to a whiteboard for handwriting notes, e.g., intended destinations, such as "school", "work", etc. In such a case, the navigation board 200 may be positioned vertically for ease of writing on a surface of the navigation board 200.

In an embodiment, the surface 202 may include a relief type surface, where the relief type or structured surface may be a model of a city, a countryside or something similar. An RFID tag of the one or more RFID tags 208 may be positioned below or within a point of interest 206. In such a case, the navigation board 200 may be better positioned inclined or in a horizontal position.

In an embodiment, the navigation board 200 may include a sign with points of interest 206, e.g., a village. An RFID tag 208 may be positioned close to each point of interest 206 shown on a map or a list. A user may position an RFID-enabled vehicle key close to one of the points of interest 206 and may program the vehicle navigation system 106 by bringing the vehicle key into the car 108 such that a destination of the selected point of interest 206 may be programmed into the vehicle navigation system 106 automatically. In an embodiment, a public address book may be available via a cloud computing center 112 from which the vehicle navigation system 106 may receive a mapping of the RFID tags 208 of the navigation board 200 used as a signpost and geographical coordinates of the intended destination (the selected point of interest).

FIG. 2 shows an exemplary mapping, i.e., tuples, of RFID tag identifiers and potential locations. For example, an RFID 1 may be related to the address IBM, 220 Schoenaicher Street in Boeblingen. The geographical location may be related to a pair of geographical coordinates, e.g., in the Universal Transversal Mercator (hereinafter "UTM") coordinate system format using latitude and longitude, as shown in case of RFID 2. The High School in Boeblingen may be associated to an RFID 3.

Figure 3:
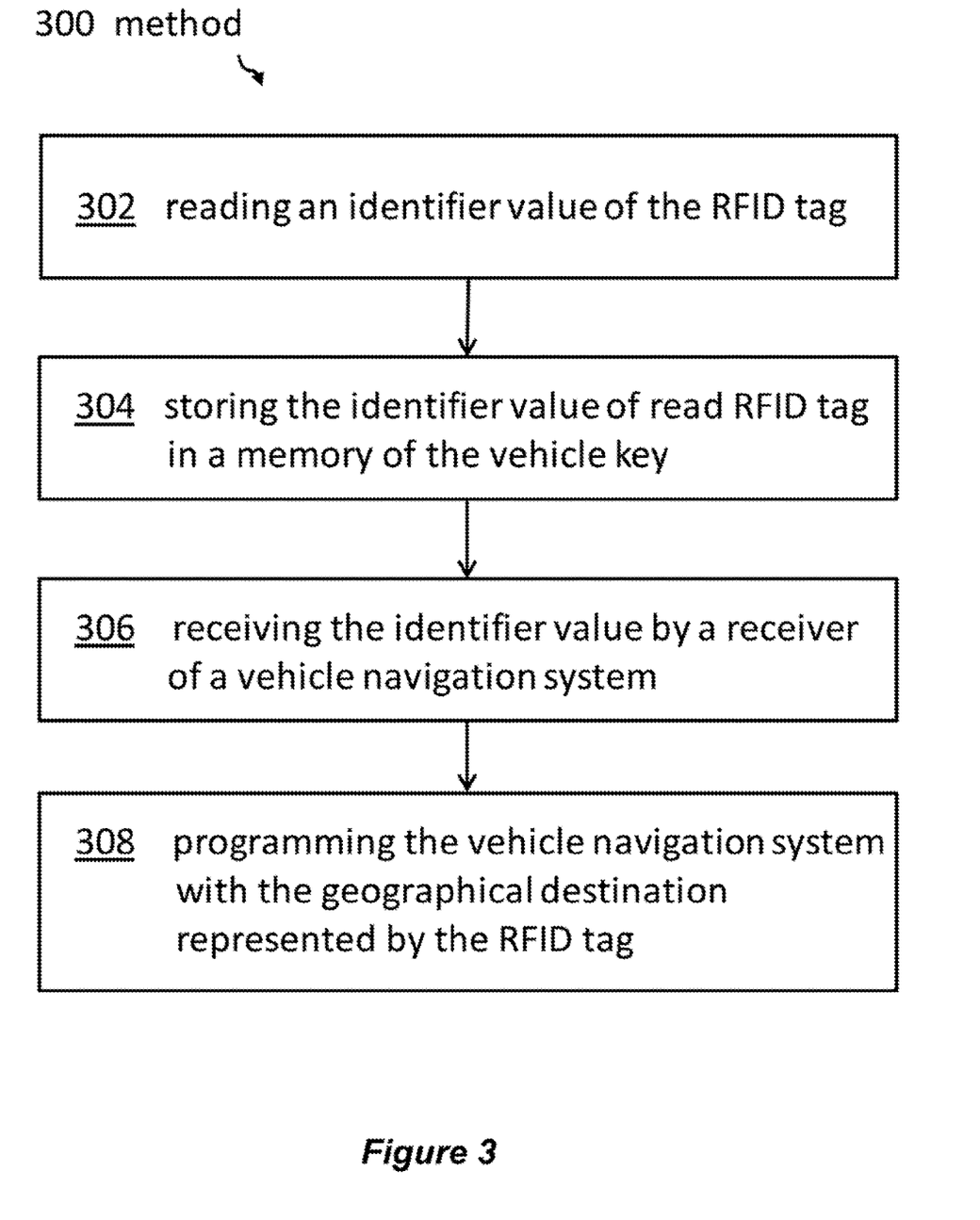
FIG. 3 shows a block diagram of an embodiment of a method for programming an intended geographical destination into a global positioning system enabled vehicle navigation system, according to at least one embodiment.

FIG. 3 shows a block diagram of an embodiment of a related computer implemented method 300 for programming an intended geographical destination into a global positioning system enabled vehicle navigation system 106, in an embodiment. The method 300 includes reading, 302, an identifier value of an RFID tag 208 by a reader of a vehicle key 104 when the vehicle key 104 is in proximity of the RFID tag 208 of a navigation board 200. The navigation board 200 includes at least one RFID tag 208 underneath, within, or on a surface 202 of the navigation board 200. The surface 202 may comprise a symbol at a position of the at least one RFID tag 208. The at least one RFID tag 208 represents a geographical destination, for example, a location name, coordinates, or an address.

The method 300 includes further storing, 304, an identifier value of a read RFID tag 208 in a memory of the vehicle key 104. The method 300 includes receiving, 306, by a receiver of a vehicle navigation system 106, the identifier value stored in the vehicle key 104 when the vehicle key 104 is in an activation mode for the vehicle. The method 300 includes programming, 308, the vehicle navigation 106 system with the geographical destination represented by the at least one RFID tag 208 of the navigation board as a next destination.

Figure 4:
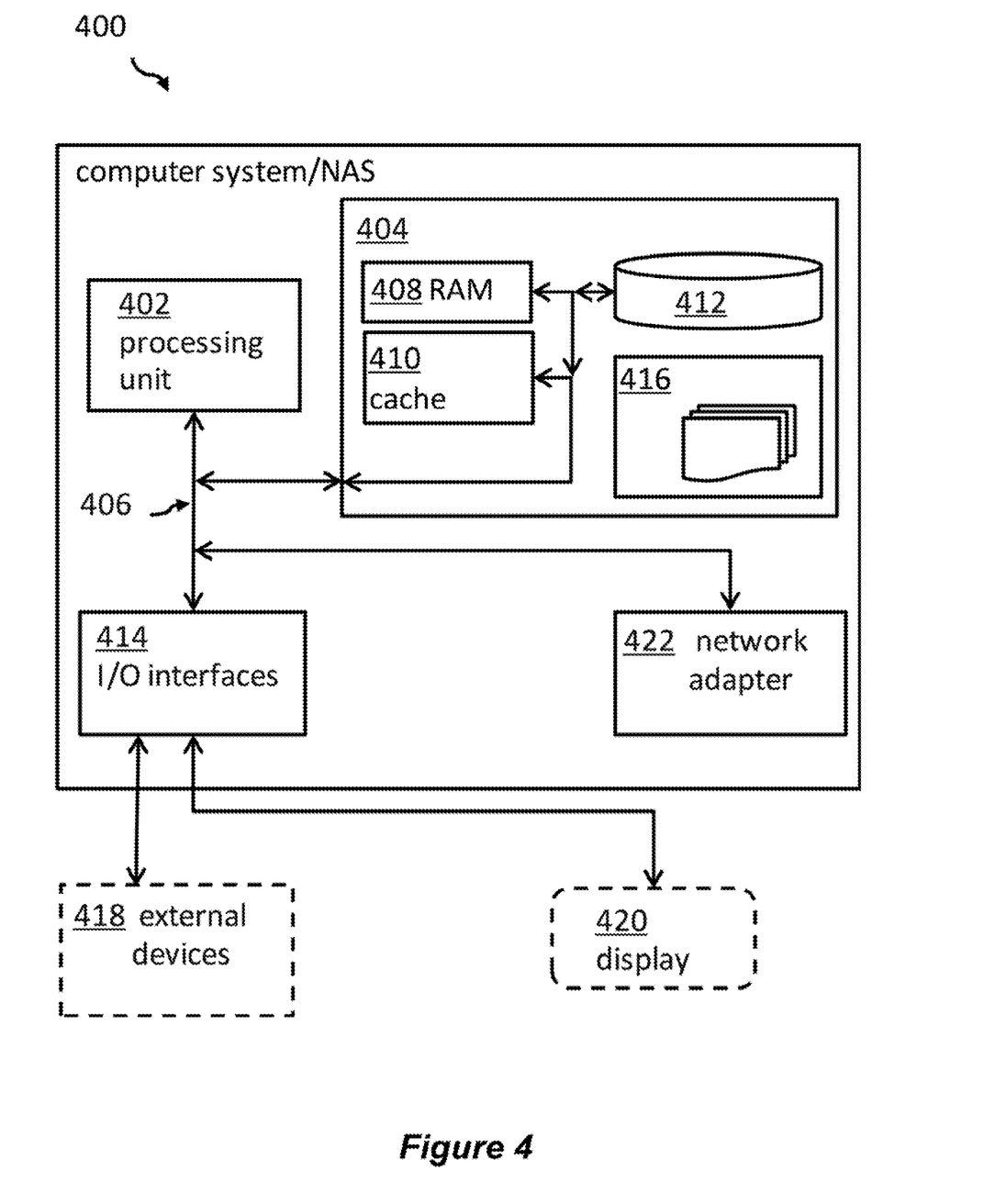
FIG. 4 shows an embodiment of a computing system suitable to support the proposed system and method according to at least one embodiment.

Embodiments of the invention may be implemented together with virtually any type of computer, regardless of the platform being suitable for storing and/or executing program code. FIG. 4 shows, as an example, a computing system 400, e.g., used inside the vehicle navigation system 106 or as basis for the smartphone 110, suitable for executing program code related to the proposed method 300, according to an embodiment. The computer system 400 may be referred to as a network attached storage (hereinafter "NAS").

The computing system 400 is an example of a suitable computer system, and is not intended to suggest any limitation as to the scope of use or functionality of embodiments of the invention described herein, regardless, whether the computer system 400 is capable of being implemented and/or performing any of the functionality set forth hereinabove. In the computer system 400, there are components, which are operational with numerous other general purpose or special purpose computing system environments or configurations. Examples of well-known computing systems, environments, and/or configurations that may be suitable for use with computer system/server 400 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. The computer system/server 400 may be described in the general context of computer system-executable instructions, such as program modules, being executed by a computer system 400. Generally, program modules may include routines, programs, objects, components, logic, data structures, and so on that perform particular tasks or implement particular abstract data types. The computer system/server 400 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 400 is shown in the form of a general-purpose computing device. The components of computer system/server 400 may include, but are not limited to, one or more processors or processing units 402, a system memory 404, and a bus 406 that couple various system components including system memory 404 to the processor 402. The bus 406 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system/server 400 typically includes a variety of computer system readable media. Such media may be any available media that is accessible by computer system/server 400, and it includes both, volatile and non-volatile media, removable and non-removable media.

The system memory 404 may include computer system readable media in the form of volatile memory, such as random access memory (RAM) 408 and/or cache memory 410. The computer system/server 400 may further include other removable/non-removable, volatile/non-volatile computer system storage media. By way of example only, a storage system 412 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to the bus 406 by one or more data media interfaces. As will be further depicted and described below, the memory 404 may include at least one program product having a set (e.g., at least one) of program modules 416 that are configured to carry out the functions of embodiments of the invention.

The program/utility, having a set (at least one) of program modules 416, may be stored in memory 404 by way of example, and not limiting, as well as an operating system, one or more application programs, other program modules, and program data. Each of the operating systems, one or more application programs, other program modules, and program data or some combination thereof, may include an implementation of a networking environment. The program modules 416 generally carry out the functions and/or methodologies of embodiments of the invention, as described herein.

The computer system/server 400 may also communicate with one or more external devices 418 such as a keyboard, a pointing device, a display 420, etc.; one or more devices that enable a user to interact with computer system/server 400; and/or any devices (e.g., network card, modem, etc.) that enable computer system/server 400 to communicate with one or more other computing devices. Such communication can occur via Input/Output (I/O) interfaces 414. The computer system/server 400 may communicate with one or more networks such as a local area network (LAN), a general wide area network (WAN), and/or a public network (e.g., the Internet) via network adapter 422. As depicted, the network adapter 422 may communicate with the other components of computer system/server 400 via bus 406. It should be understood that, although not shown, other hardware and/or software components could be used in conjunction with computer system/server 400. Examples, include, but are not limited to: microcode, device drivers, redundant processing units, external disk drive arrays, RAID systems, tape drives, and data archival storage systems, etc.

Figure 5:
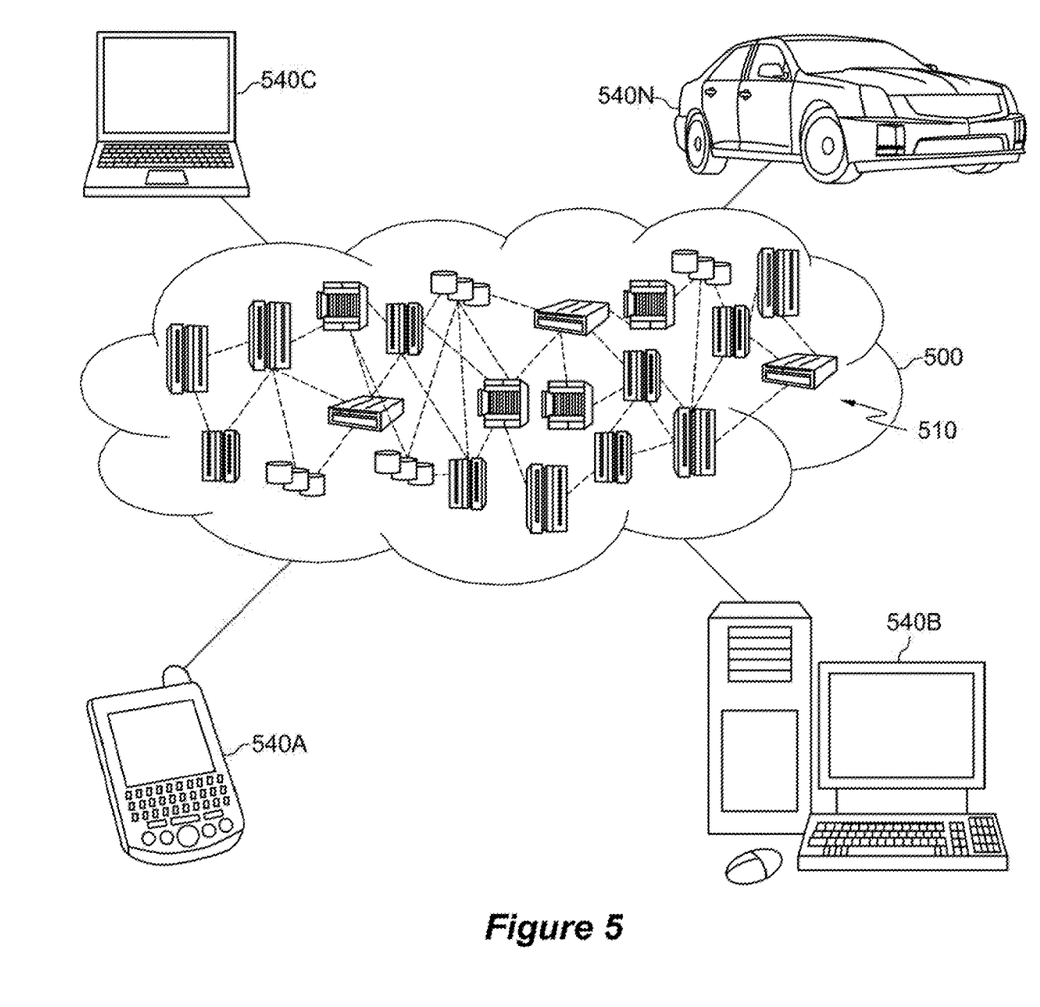
FIG. 5 shows a cloud computing environment according to an embodiment of the present invention.

Referring now to FIG. 5, illustrative cloud computing environment 500 is depicted, according to an embodiment. As shown, cloud computing environment 500 comprises one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Nodes 510 may communicate with one another. They may be grouped (not shown) physically or virtually, in one or more networks, such as Private, Community, Public, or Hybrid clouds as described herein, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 5 are intended to be illustrative only and that computing nodes 510 and cloud computing environment 500 can communicate with any type of computerized device over any type of network and/or network addressable connection (e.g., using a web browser).

Figure 6:
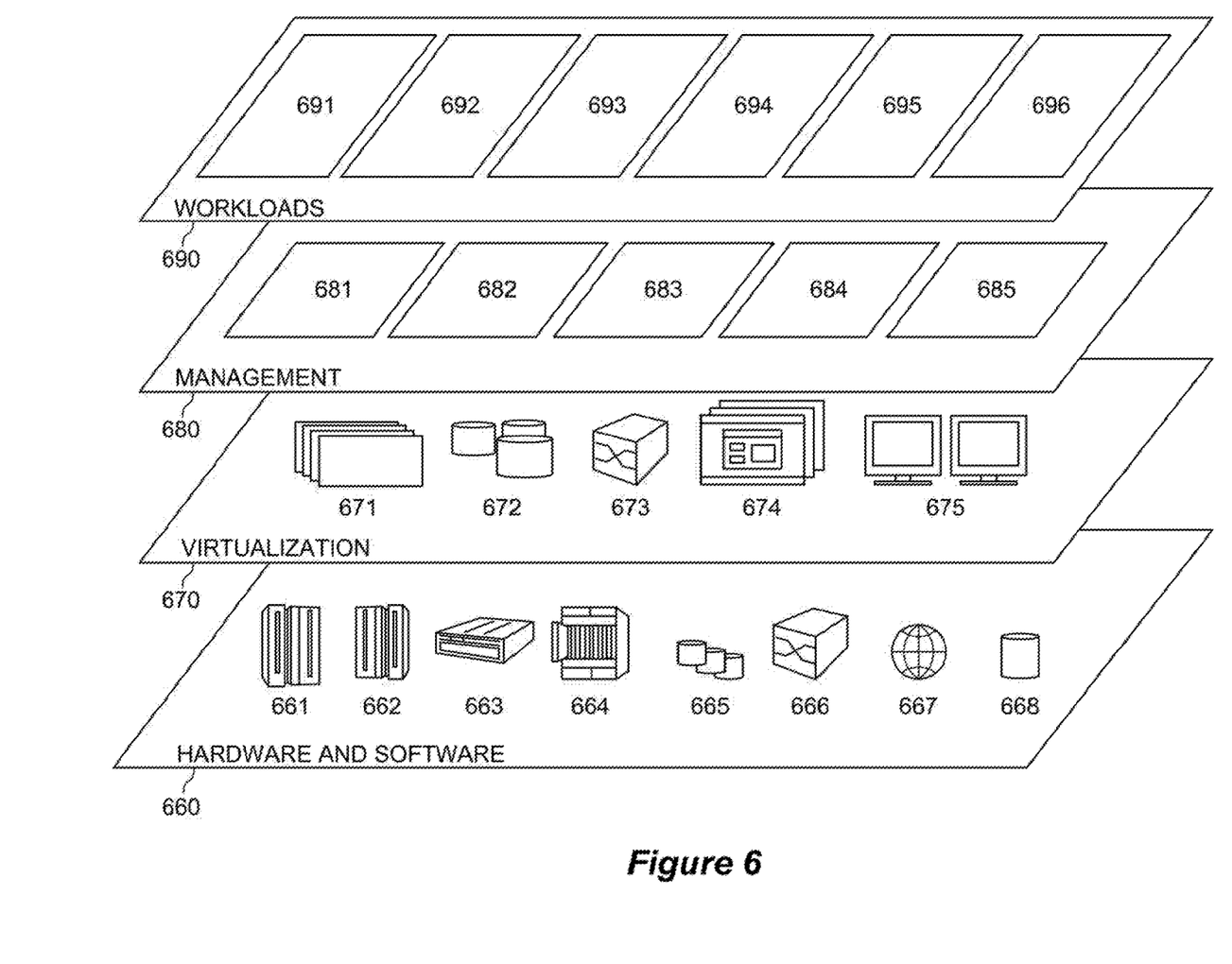
FIG. 6 shows abstraction model layers according to an embodiment of the present invention.

Referring now to FIG. 6, a set of functional abstraction layers provided by cloud computing environment 500 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and automatic destination loading into a vehicle navigation system program 696. The vehicle navigation system program 696 may relate to storing destination information from a navigation board into a RFID key and transferring the destination information from the RFID key to a vehicle navigation system to provide driving directions to a user.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

In summary, various embodiments have been discussed which are again specified in the following numbered clauses:

1. A system for programming an intended geographical destination into a global positioning system enabled vehicle navigation system, the system comprising a navigation board comprising at least one radio frequency identifier (RFID) tag underneath its surface, the surface comprising a symbol at a position of the RFID tag, the RFID tag representing a geographical destination, an RFID-enabled vehicle key comprising an RFID tag reader adapted for a wireless reading of an identifier value of the at least one RFID tag of the navigation board if the vehicle key is in proximity of the at least one RFID tag of the navigation board, wherein the vehicle key also comprises a memory for storing the identifier value of the at least one RFID tag, and a vehicle navigation system comprising a receiver for receiving the identifier value stored in the vehicle key if the vehicle key is in an activation mode for the vehicle such that the vehicle navigation system is programmed with the geographical destination represented by the at least one RFID tag of the navigation board.

2. The system according to clause 1, also comprising a mobile device comprising an RFID tag reader enabled to wirelessly reading the identifier value of the at least one RFID tag of the navigation board if the mobile device is in proximity of the at least one RFID tag of the navigation board.

3. The system according to clause 2, the mobile device comprising an assignment unit adapted for assigning a geographical location to the received identifier value of the RFID tag of the navigation board so as to define a value tuple comprising the identifier value and the geographical location.

4. The system according to clause 3, wherein the assignment unit is adapted for accessing the geographical location from an address storage accessible by the mobile device, wherein the address storage is local in the mobile device or remote to the mobile device.

5. The system according to clause 3, wherein the mobile device also comprises a sending unit adapted for sending the value tuple to the vehicle navigation system for storing the value tuple in a location memory of the vehicle navigation system.

6. The system according to any of the preceding clauses, wherein the identifier value of the RFID relates to a predefined geographical location according to a publicly available address book.

7. The system according to clause 6, wherein the vehicle navigation system is adapted to receive value tuples of identifier values and the related geographical locations from the publicly available address book.

8. The system according to any of the preceding clauses, wherein the navigation board comprises a plurality of RFID tags underneath its surface representing a plurality of geographical destinations.

9. A computer-implemented method for programming an intended geographical destination into a global positioning system enabled vehicle navigation system, the method comprising reading an identifier value of a radio frequency identifier (RFID) tag by a reader of an RFID-enabled vehicle key if the vehicle key is in proximity of the RFID tag of a navigation board, wherein the navigation board comprises at least one RFID tag underneath its surface, the surface comprising a symbol at a position of the at least one RFID tag, and wherein the at least one RFID tag represents a geographical destination, storing the identifier value of the read RFID tag in a memory of the vehicle key, receiving, by a receiver of a vehicle navigation system, the identifier value stored in the vehicle key if the vehicle key is in an activation mode for the vehicle, and programming the vehicle navigation system with the geographical destination represented by the at least one RFID tag of the navigation board as a next destination.

10. The method according to clause 10, also comprising reading the identifier value of the at least one RFID tag of the navigation board by an RFID reader of a mobile device if the mobile device is in proximity of the at least one RFID tag of the navigation board.

11. The method according to clause 10, also comprising assigning a geographical location to the received identifier value of the RFID tag of the navigation board, so as to define a value tuple comprising the identifier value and the geographical location.

12. The method according to clause 11, also comprising accessing the geographical location from an address storage accessible by the mobile device, wherein the address storage is local in the mobile device or remote to the mobile device.

13. The method according to clause 11, also comprising sending the value tuple from the mobile device to a location memory of the vehicle navigation system.

14. The method according to any of the clauses 9 to 13, wherein the identifier value of the RFID tag relates to a predefined geographical location according to a publicly available address book.

15. The method according to clause 14, wherein the vehicle navigation system is adapted to receive value tuples of identifier values and the related geographical locations from the publicly available address book.

16. The method according to any of the clauses 9 to 15, wherein the navigation board comprises a plurality of RFID tags underneath its surface representing a plurality of geographical destinations.

17. A computer program product for programming an intended geographical destination into a global positioning system enabled vehicle navigation system, the computer program product comprising a computer readable storage medium having program instructions embodied therewith, the program instructions being executable by one or more computing systems or controllers to cause the one or more computing systems to read an identifier value of a radio frequency identifier (RFID) tag by a reader of an RFID-enabled vehicle key if the vehicle key is in proximity of the RFID tag of a navigation board, wherein the navigation board comprises at least one RFID tag underneath its surface, the surface comprising a symbol at a position of the at least one RFID tag, and wherein the at least one RFID tag represents a geographical destination, store the identifier value of the read RFID tag in a memory of the vehicle key, receive, by a receiver of a vehicle navigation system, the identifier value stored in the vehicle key if the vehicle key is in an activation mode for the vehicle, and program the vehicle navigation system with the geographical destination represented by the at least one RFID tag of the navigation board as a next destination.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for programming an intended geographical destination into a global positioning system enabled vehicle navigation system, the system comprising:
   a navigation board comprising a radio frequency identifier (RFID) tag underneath a surface of the navigation board, the surface comprising a symbol at a position the one RFID tag, wherein the RFID tag represents a geographical destination;
   an RFID enabled vehicle key comprising an RFID tag reader configured to wireless reading of an identifier value of the RFID tag when the vehicle key is in proximity of the RFID tag, wherein the vehicle key comprises a memory for storing the identifier value of the RFID tag; and
   a vehicle navigation system comprising a receiver configured to receiving the identifier value of each of the RFID tag stored in the vehicle key when the vehicle key is in an activation mode for the vehicle such that the vehicle navigation system is programmed with the corresponding geographical destination represented by the RFID tag.

2. The system according to claim 1, further comprising:
   a mobile device comprising an RFID tag reader configured to wirelessly reading the identifier value of the RFID tag when the mobile device is in proximity of the RFID tag.

3. The system according to claim 2, wherein the mobile device further comprises:
   an assignment unit adapted for assigning a corresponding geographical location to the received identifier value of the RFID tag which defines a value tuple comprising the identifier value and the geographical location for the RFID tag.

4. The system according to claim 3, wherein the assignment unit is adapted for accessing the geographical location from an address storage accessible by the mobile device, wherein the address storage is local in the mobile device or remote to the mobile device.

5. The system according to claim 3, wherein the mobile device further comprises:
   a sending unit adapted for sending the value tuple to the vehicle navigation system for storing the value tuple in a location memory of the vehicle navigation system.

6. The system according to claim 1, wherein the identifier value of the RFID tag relates to a predefined geographical location according to a publicly available address book.

7. The system according to claim 6, wherein the vehicle navigation system is configured to receive value tuples of identifier values and the related geographical locations from the publicly available address book.

8. The system according to claim 1, wherein the navigation board comprises a plurality of RFID tags underneath its surface, wherein each of the plurality of RFID tags represents a corresponding geographical destination.

9. A computer-implemented method for programming an intended geographical destination into a global positioning system enabled vehicle navigation system, the method comprising:
   configuring to read an identifier value of a radio frequency identifier (RFID) tag by a reader of an RFID-enabled vehicle key when the vehicle key is in proximity of the RFID tag of a navigation board, wherein the navigation board comprises at least one RFID tag underneath its surface, the surface comprising a symbol at a position of the at least one RFID tag, and wherein the at least one RFID tag represents a geographical destination;

storing the identifier value of the read RFID tag in a memory of the vehicle key;

receiving, by a receiver of a vehicle navigation system, the identifier value stored in the vehicle key if the vehicle key is in an activation mode for the vehicle; and programming the vehicle navigation system with the geographical destination represented by the at least one RFID tag as a next destination.

10. The method according to claim 9, further comprising:
configuring to read the identifier value of the at least one RFID tag of the navigation board by an RFID reader of a mobile device when the mobile device is in proximity of the RFID tag.

11. The method according to claim 10, further comprising:
assigning a geographical location to the received identifier value of the RFID tag of the navigation board, so as to define a value tuple comprising the identifier value and the geographical location.

12. The method according to claim 11, further comprising:
accessing the geographical location from an address storage accessible by the mobile device, wherein the address storage is local in the mobile device or remote to the mobile device.

13. The method according to claim 11, further comprising:
sending the value tuple from the mobile device to a location memory of the vehicle navigation system.

14. The method according to claim 9, wherein the identifier value of the RFID tag relates to a predefined geographical location according to a publicly available address book.

15. The method according to claim 14, wherein the vehicle navigation system is adapted to receive value tuples of identifier values and the related geographical locations from the publicly available address book.

16. The method according to claim 9, wherein the navigation board comprises a plurality of RFID tags underneath its surface, each of the plurality of RFID tags representing a corresponding geographical destination of a plurality of geographical destinations.

17. A computer program product for programming an intended geographical destination into a global positioning system enabled vehicle navigation system, the computer program product comprising:

one or more computer-readable tangible storage medium and program instructions stored on at least one of the one or more tangible storage medium, the program instructions executable by a processor, the program instructions comprising:

program instructions configured to read an identifier value of a radio frequency identifier (RFID) tag by a reader of an RFID-enabled vehicle key when the vehicle key is in proximity of the RFID tag of a navigation board, wherein the navigation board comprises at least one RFID tag underneath its surface, the surface comprising a symbol at a position of the at least one RFID tag, and wherein the at least one RFID tag represents a geographical destination;

program instructions to store the identifier value of the read RFID tag in a memory of the vehicle key;

program instructions configured to receive, by a receiver of a vehicle navigation system, the identifier value stored in the vehicle key when the vehicle key is in an activation mode for the vehicle; and program instructions to program the vehicle navigation system with the geographical destination represented by the at least one RFID tag of the navigation board as a next destination.

* * * * *